(12) United States Patent
Lukic et al.

(10) Patent No.: US 9,702,739 B2
(45) Date of Patent: Jul. 11, 2017

(54) DEVICE HOUSING FOR A MEASURING DEVICE

(71) Applicant: Hilti Aktiengesellschaft, Schaan (LI)

(72) Inventors: Sasha Lukic, Buchs (CH); Franz Felsberger, Chur (CH); Patrick Lampert, Mauren (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/763,673

(22) PCT Filed: Jan. 22, 2014

(86) PCT No.: PCT/EP2014/051159
§ 371 (c)(1),
(2) Date: Jul. 27, 2015

(87) PCT Pub. No.: WO2014/118036
PCT Pub. Date: Aug. 7, 2014

(65) Prior Publication Data
US 2015/0369639 A1    Dec. 24, 2015

(30) Foreign Application Priority Data
Jan. 29, 2013    (DE) .......................... 10 2013 201 412

(51) Int. Cl.
*G01D 11/24*    (2006.01)
*G01C 15/00*    (2006.01)
(52) U.S. Cl.
CPC ......... *G01D 11/245* (2013.01); *G01C 15/004* (2013.01)

(58) Field of Classification Search
CPC .............................. G01D 11/24; G01D 11/245
USPC .......................................................... 73/431
See application file for complete search history.

(56) References Cited

U.S. PATENT DOCUMENTS

| | | | |
|---|---|---|---|
| 4,213,532 A | 7/1980 | Eggert et al. | |
| 6,068,821 A * | 5/2000 | VanDeGraaf ............ | A61L 2/28 206/521.2 |
| 6,128,326 A * | 10/2000 | Kousek ................ | G01C 15/004 356/247 |
| 8,915,626 B2 * | 12/2014 | Lettermann ................ | 362/153.1 |
| 2004/0111898 A1 | 6/2004 | Marshall et al. | |
| 2007/0153532 A1 | 7/2007 | Milligan et al. | |

(Continued)

FOREIGN PATENT DOCUMENTS

| | | |
|---|---|---|
| CN | 1609554 | 4/2005 |
| CN | 101282897 | 10/2008 |

(Continued)

*Primary Examiner* — Lisa Caputo
*Assistant Examiner* — Jamel Williams
(74) *Attorney, Agent, or Firm* — Davidson, Davidson & Kappel, LLC

(57) ABSTRACT

A measuring device (30) including a device housing (31) having at least one housing section (37;36) and including a measuring unit (32) that is arranged at least partially inside the device housing (31). The at least one housing section (37;36) includes a first segment made of a first material and a second segment made of a second material that differs from the first material. The first material is an elastomeric or thermoplastic-elastomeric plastic with a rebound resilience of less than 40% and a Shore-A hardness of less than 80, and the second material is a hard thermoplastic or a metal.

14 Claims, 5 Drawing Sheets

(56) References Cited

U.S. PATENT DOCUMENTS

| | | | |
|---|---|---|---|
| 2008/0043409 A1* | 2/2008 | Kallabis | F16P 1/02 361/824 |
| 2009/0257060 A1 | 10/2009 | Birlem | |
| 2011/0315834 A1 | 12/2011 | Lukic | |

FOREIGN PATENT DOCUMENTS

| | | | |
|---|---|---|---|
| DE | 202006014576 | 1/2008 | |
| EP | 2400204 | 12/2001 | |
| EP | 2284547 | 2/2011 | |
| JP | S5227303 | 3/1977 | |
| LI | EP 2400204 A2 * | 12/2011 | ............. F16M 11/18 |
| LI | WO 2014118031 A1 * | 8/2014 | ............. G01C 15/04 |
| WO | WO98/32472 | 7/1998 | |

* cited by examiner

DEVICE HOUSING FOR A MEASURING DEVICE

The present invention relates to a measuring device comprising a device housing and a measuring unit.

The term "measuring device" within the scope of the present invention encompasses all devices that use a measuring unit having optical or electro-optical components. Examples of measuring devices are laser distance-measuring devices, dot and line laser devices, rotating laser devices and detectors for detecting objects in the ground.

BACKGROUND

Known measuring devices comprise a housing and a measuring unit arranged inside the device housing. FIG. 1 shows a prior-art measuring device 10 configured as a rotating laser, consisting of a device housing 11 and of a measuring unit 12 that is arranged in the device housing 1 and that is shown schematically in FIG. 1. The device housing 11 of the rotating laser 10 has a base housing 13, a rotating head 14 and several handles 15. The base housing 13 is configured to be essentially cylindrical and it comprises a bottom surface 16, a top surface 17 opposite from the bottom surface 16 and a side surface 8 that connects the bottom and top surfaces 16, 17. The rotating head 14 comprises a cover element 21 that is connected to the top surface 17 of the base housing 13 via several crosswise webs 22 that are connected to each other. The handles 15 comprise a grip element 23 as well as an upper attachment element 24 and they comprise a lower element 25 for attaching the handles 15 to the base housing 13. FIG. 1 shows a variant in which the handles 15 are snapped onto the base housing 13 at the upper end 26 and screwed onto the base housing 13 at the lower end 27.

The various sections of the device housing 11, which are configured as the base housing 13, the rotating head 14 and the handles 15, are made of thermoplastics and consist either of a hard thermoplastic or else of a hard thermoplastic and a soft thermoplastic-elastomeric plastic produced by means of a multi-component injection-molding process. The cover element of the rotating head and the handles consist of a first and second material configured as a hard thermoplastic and of a soft thermoplastic-elastomeric plastic. Due to the design and the materials employed, the prior-art measuring devices are not sufficiently sturdy in case of impact or a fall from a drop height of more than 1 meter.

SUMMARY OF THE INVENTION

It is an object of the present invention to provide a sturdy device housing for a measuring device having a measuring unit arranged in the device housing, whereby the measuring unit is protected against damage in case of impact or a fall from a drop height of more than 1 meter. Moreover, aside from the measuring unit, the device housing and the device components attached to the device housing should also be protected.

The present invention provides that the first material is an elastomeric or thermoplastic-elastomeric plastic with a rebound resilience (R) of less than 40% and a Shore-A hardness of less than 80, and the second material is a hard thermoplastic or a metal.

Depending on their mechanical behavior under the influence of heat, plastics are divided into thermoplastics, thermosetting plastics, and elastomeric plastics. Thermoplastics are non-crosslinked plastics that can be repeatedly deformed; the more they are heated, the better they can be deformed. Whether a thermoplastic is hard or soft at room temperature depends on its glass transition temperature; it is soft and can be deformed above the glass transition temperature, whereas it is solid and cannot be deformed below the glass transition temperature. Familiar thermoplastics are, for example, polyolefins (PE, PP), styrene plastics (PS, ABS, SAN), polyesters (PBT, PC), polyacetals (POM) and polyamides (PA). The main method for shaping thermoplastics is injection molding. Elastomers or rubber materials are dimensionally stable, elastically deformable plastics that are elastically deformed under tensile and compressive load, after which they return to their original non-deformed shape. Elastomeric plastics are rubbers (e.g. natural rubber (NR), nitrile-butadiene rubber (NBR), ethylene-propylene-diene rubber (EPDM), silicon rubber (LSR, RTV)) and polyurethane (PUR) elastomers. Polyurethane is a versatile plastic; a suitable reaction regimen and proper selection of the monomers yield polyurethanes having different degrees of crosslinking. Closely crosslinked polyurethane is hard as well as tough and resilient, and it is belongs to the thermosetting plastics. In contrast, loosely crosslinked polyurethane is soft and rubbery-elastic, and it belongs to the elastomeric plastics. Non-crosslinked polyurethane has the properties of a thermoplastic. Thanks to its excellent mechanical and physical properties, polyurethane produced by means of foaming is used in the construction sector as PUR rigid foam, but it is also used as permanently flexible PUR foam for technical applications. As a special group of elastomers, the thermoplastic elastomers (TPE), for example, on the basis of olefins (TPE-O), on the basis of styrenes (TPE-S) or on the basis of urethanes (TPE-U), combine the typical properties of elastomers with the processing capabilities of thermoplastics.

The rebound resilience (R) is a characteristic value of elastomeric plastics; it is defined in the standard DIN 53512 and it serves to evaluate the elasticity behavior when subjected to impact. The standard ISO 4662 applies to rubber. In order to determine the rebound resilience, a defined pendulum hammer strikes a test specimen; the working capacity of the pendulum hammer is 0.5 J. A semispherical peen with a diameter of 15 mm is employed as the pendulum hammer. The rebound resilience is calculated on the basis of the deflection of the pendulum hammer. The release angle is 90° and the length of the pendulum hammer is 200 mm. The rebound resilience (R) is calculated from the quotient of the rebound height divided by the starting height times one hundred.

The Shore hardness is a characteristic value of elastomeric plastics and it is defined in the standards DIN 53505 and DIN 7868. The measuring methods differ for soft elastomers and tough elastomers. A Shore-A hardness is determined for soft elastomers whereas a Shore-D hardness is determined for tough elastomers. The Shore-A hardness is measured with a rod that has a tip with a truncated cone having an end face with a diameter of 0.79 mm and an opening angle of 35°; the applied mass is 1 kg and the holding time is 15 seconds. The Shore-D hardness is measured with a rod that has a tip with a conical point having a radius of 0.1 mm and an opening angle of 30°; the applied mass is 5 kg and the holding time is 15 seconds. Normally, a precision of ±5 units is assumed for the Shore hardness.

Owing to the structure of a housing section for the measuring device made of an elastomeric or thermoplastic-elastomeric plastic having a rebound resilience (R) of less than 40% and a Shore-A hardness of less than 80, in case of impact or a fall from a great height, the housing section can deform elastically and can subsequently return to its undeformed shape. The impact energy is dissipated in the device housing and it is not transferred to the measuring unit, thus protecting the measuring unit against damage. The properties of the first material are selected with an eye towards achieving a high energy dissipation. An elastomeric or thermoplastic-elastomeric plastic with a rebound resilience of less than 40% and a Shore-A hardness of less than 80 protects the measuring unit against damage in case of impact or a fall from a drop height of more than 1 meter. The second material is used in the areas of the housing section that are adjacent to other sections of the device housing and that have to be connected to them. The two-part structure of the housing section with the second material that is configured as a hard, thermoplastic or as a metal permits a secure connection of the housing section to the surrounding sections of the device housing. Thermoplastics have the advantage over elastomeric plastics that they can be welded and that they can be connected to surrounding housing sections by means of screwed connections.

Preferably, the first segment of the housing section is connected to the second segment by means of a multi-component method. Multi-component methods make it possible to produce molded parts inexpensively in one work cycle and, through the systematic combination of materials and material properties, they permit the integration of functionalities such as design, haptics, sealing functions or assembly aids. When polyurethane is the elastomeric plastic used, the first material can be connected to the second material by means of foaming; the shaping of the first material and the connecting of the first and second materials are carried out in one process step by foaming the first material.

Especially preferably, the second segment has an elastically flexible connection element in the connection area leading to the first segment. The connection element enlarges the connection surface between the first and the second segments of the housing section. The larger the connection surface, the better the connection between the first and second segments. Moreover, the connection element functions like a spring element that can deform elastically due to the effect of impact or a fall, and that can subsequently return to its original shape.

Preferably, the volume content of the first material in the first segment amounts to at least 40%. Owing to a volume content of elastomeric or thermoplastic-elastomeric plastic amounting to at least 40%, it is ensured that the impact energy will be absorbed by the device housing, even in case of drop heights of more than 1 meter, and will not be transferred to the measuring unit, thus protecting the measuring unit against damage.

In a preferred embodiment, the measuring device is configured as a rotating laser, and the device housing comprises several sections, whereby the housing sections are configured as the base housing, the rotating head and the handle. Here, each housing section of the device housing can be made of the first and second materials. In a rotating laser, the handles and the rotating head are particularly well-suited for a two-part structure made of the first and second materials, since these housing sections project from the device housing and the energy is transmitted via these housing sections in case of impact or a fall. However, the base housing of the rotating laser can also have a first segment that is made of the first material.

Especially preferably, the rotating laser has at least three handles, whereby the rotating head and the handles are attached to the base housing. Here, the at least three handles are arranged essentially uniformly around the base housing and are connected to the base housing. In the case of a rotating laser with three or more handles, the base housing can be protected against the effect of direct force on the side surface of the base housing. In case of impact or a fall, the device housing lands on the protruding handles, which can absorb and dissipate the impact energy. For this purpose, the number of handles and the dimensions of the handles are harmonized with each other in such a way that the side surface of the base housing is behind the outermost tangential connection surface between adjacent handles.

Especially preferably, the handles comprise a first segment that is configured as a grip element and that is made of the first material, and they comprise a second segment that is configured as an attachment element for attaching the handles to the base housing and that is made of the second material, whereby the volume content of the first segment in the handle amounts to at least 50%. The second material, which is configured as a hard, thermoplastic or as a metal, is used in the areas of the handles that adjoin other housing sections and that have to be connected to them. The second material permits a good connection of the handles to the base housing. A volume content of the first segment amounting to at least 50% in the grip element ensures that the impact energy for drop heights of more than 1 meter is absorbed and dissipated rather than being transferred to the measuring unit.

Preferably, the volume content of the first material in the first segment of the handles amounts to at least 50%. A volume content of elastomeric or thermoplastic-elastomeric plastic amounting to at least 50% ensures that the impact energy can be absorbed by the device housing, even in case of drop heights of more than 1 meter, and that it is not transmitted to the measuring unit, thus protecting the measuring unit against damage.

In a first variant, the volume content of the first material in the first segments of the handles is 100%. The higher the volume content of the first material in the first segment of the handles, the greater the amount of impact energy that is dissipated through the modality of elastic deformation.

In a second, alternative variant, the first segments of the handles are made of another material, whereby the other material differs from the first material. The other material can be, for example, an elastomeric plastic, a thermoplastic-elastomeric plastic, a thermoplastic or a metal. The selection of the other material in the first segments of the handles depends on the requirements being made of the handles.

Especially preferably, the first segments of the handles have an elastically flexible insert element that is made of the other material. Damping, reinforcing or process-related functions can be integrated into the insert element in the first segment of the handle. The selection of the other material and of the shape of the insert element depends on the requirements being made of the handles.

Especially preferably, the second segments of the handles comprise an upper attachment element at the upper end facing the rotating head and they comprise a lower attachment element at the lower end facing away from the rotating head for attaching the handles to the base housing. The upper and lower attachment elements ensure a permanent attachment of the handles to the base housing in case of impact or a fall.

In a preferred embodiment, the first segments of the handles comprise at least one shock absorbing element. The shock absorbing elements serve to absorb the impact energy in case of impact or a fall and to dissipate it through the modality of elastic deformation. In this context, the shock absorbing elements are provided particularly in the areas of the handles which project beyond the base housing in case of impact or a fall and via which the force is introduced into the device housing. Thanks to this configuration of the shock absorbing elements, the bottom surface, the top surface and the side surface of the base housing can all be protected.

The first segments of the handles especially preferably have a lower shock absorbing element at the lower end, whereby the lower shock absorbing elements of the handles project from the base housing in an axial direction parallel to the axis of rotation of the rotating laser. Thanks to this configuration of the lower shock absorbing elements at the lower end of the rotating laser, a device housing falling in the direction of the bottom surface lands on the lower shock absorbing elements which then absorb the impact energy and dissipate it through the modality of elastic deformation. In case of impact or a fall, the bottom surface of the base housing is protected by the lower shock absorbing elements against the effect of direct force. The side surface of the base housing can be protected in that the lower shock absorbing elements are additionally configured on the sides.

Especially preferably, the lower shock absorbing elements have a standing surface for positioning the rotating laser in an upright arrangement on a substrate for horizontal laser operation. Since the lower shock absorbing elements project from the bottom surface of the base housing, the bottom surface that is normally provided as the standing surface is not suitable as the standing surface for the rotating laser.

The first segments of the handles especially preferably have an upper shock absorbing element at the upper end. Thanks to the configuration of the upper shock absorbing elements at the upper end of the handles, the side surface of the base housing as well as the rotating head can be protected. The protective effect of the upper shock absorbing elements is particularly effective in conjunction with the shock absorbing elements on the rotating head and in conjunction with the lower shock absorbing elements of the handles. A lateral orientation of the upper shock absorbing elements protects the side surface of the base housing, while an orientation towards the rotating head protects the rotating head. Here, it should be taken into account that the extension of the upper shock absorbing elements towards the rotating head is limited by the fact that the laser beam rotating around the axis of rotation is not supposed to be interrupted by the upper shock absorbing elements.

Preferably, the first segments of at least two of the handles of the rotating laser have integrated placement elements for positioning the rotating laser in a prone arrangement on a substrate for vertical laser operation.

In a preferred embodiment, the rotating head comprises a first segment that is configured as a top element and that is made of the first material, and it comprises a second segment that has several crosswise webs and that is made of the second material, whereby the volume content of the first segment amounts to at least 50%. A volume content of the first segment amounting to at least 50% in the rotating head ensures that, in case of drop heights of more than 1 meter, if the device is dropped on the rotating head, the impact energy will be absorbed and dissipated by the device housing and will not be transferred to the measuring unit.

Especially preferably, the volume content of the first material in the first segment of the rotating head amounts to at least 50%. Owing to a volume content of elastomeric or thermoplastic-elastomeric plastic amounting to at least 50%, it is ensured that, even in case of drop heights of more than 1 meter, the impact energy will be absorbed by the rotating head and will not be transferred to the measuring unit, thus protecting the measuring unit against damage.

In a first variant, the volume content of the first material in the first segment of the rotating head is 100%. The higher the volume content of the first material in the first segment of the rotating head, the greater the amount of impact energy that is dissipated through the modality of elastic deformation.

In a second, alternative variant, the first segment of the rotating head is made of another material, whereby the other material differs from the first material. The other material can be, for example, an elastomeric plastic, a thermoplastic-elastomeric plastic, a thermoplastic or a metal. The selection of the other material depends on the requirements being made of the rotating head.

Especially preferably, the first segment of the rotating head has an elastically flexible insert element that is made at least partially of the other material. Damping, reinforcing or process-related functions can be integrated into the insert element in the first segment of the rotating head. The selection of the other material and the shape of the insert element depend on the requirements being made of the rotating head.

Especially preferably, the first segment of the rotating head comprises at least one shock absorbing element. Thanks to this configuration of shock absorbing elements on the rotating head, in case of impact or a fall, the device housing lands on the shock absorbing elements, which absorb the impact energy and dissipate it through the modality of elastic deformation. In case of impact or a fall, the shock absorbing elements protect the cover element and the crosswise webs of the rotating head against the excessive effect of direct forces. The protective effect of the shock absorbing elements on the rotating head is particularly effective in conjunction with the upper shock absorbing elements of the handles.

Especially preferably, the number of shock absorbing elements of the rotating head matches the number of handles. Here, the shapes and the orientation of the shock absorbing elements of the rotating head and of the upper shock absorbing elements of the handles are harmonized with each other since the protective effect of the shock absorbing elements of the rotating head is particularly effective in conjunction with the upper shock absorbing elements of the handles.

The outer surfaces of the grip elements and of the shock absorbing elements that strike an obstacle or land on the ground in case of impact or a fall of the rotating laser especially advantageously enclose an obtuse angle between 90° and 180°. Owing to this configuration of the outer surfaces, the rotating laser can roll on the ground in case of impact or a fall and can thus dissipate some of the impact energy.

BRIEF DESCRIPTION OF THE DRAWINGS

Embodiments of the invention will be described below with reference to the drawing. The drawing does not necessarily depict the embodiments true-to-scale, but rather, the drawing has been made schematically and/or in slightly distorted form whenever necessary for the sake of clarity. Regarding any additions to the teaching that can be gleaned directly from the drawing, reference is hereby made to the pertinent state of the art. In this context, it should be taken into consideration that a wide variety of modifications and changes can be made relating to the shape and the detail of a given embodiment without departing from the general idea of the invention. The features of the invention disclosed in the description, in the drawing as well as in the claims can be essential for the refinement of the invention, either individually or in any desired combination. Moreover, all combinations of at least two of the features disclosed in the description, in the drawing and/or in the claims fall within the scope of the invention. The general idea of the invention is not limited to the exact form or detail of the preferred embodiment shown and described below, nor is it limited to a subject matter that would be limited in comparison to the subject matter being put forward in the claims. At given rated ranges, values that fall within the cited limits are also to be disclosed as limit values and can be used and claimed in any desired manner. For the sake of clarity, identical or similar parts or else parts with an identical or similar function are designated below by the same reference numerals.

The following is shown.

DETAILED DESCRIPTION

Figure 1:
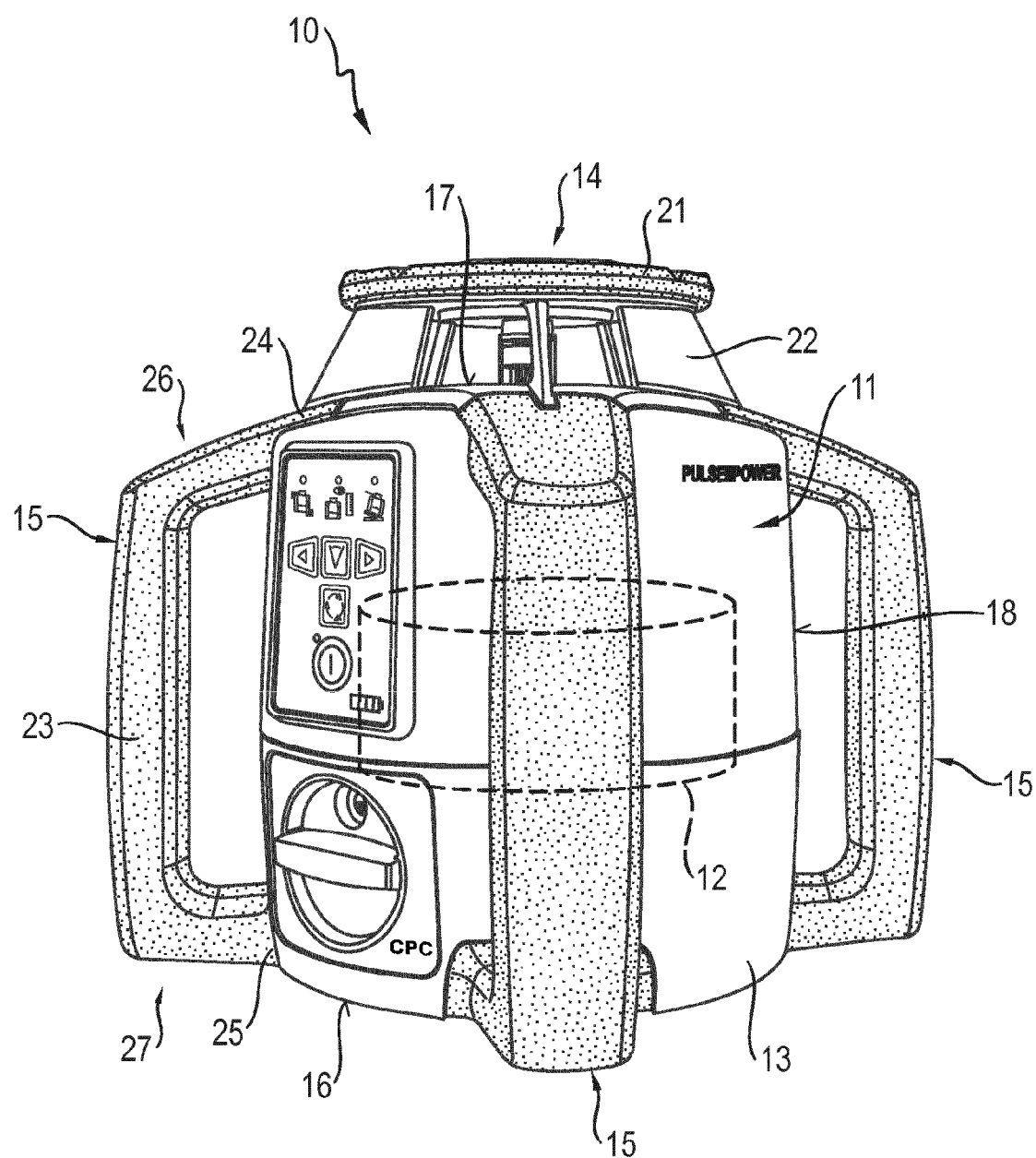
FIG. 1 a prior-art measuring device configured as a rotating laser with a device housing consisting of a base housing, a rotating head and several handles.
Figure 2:
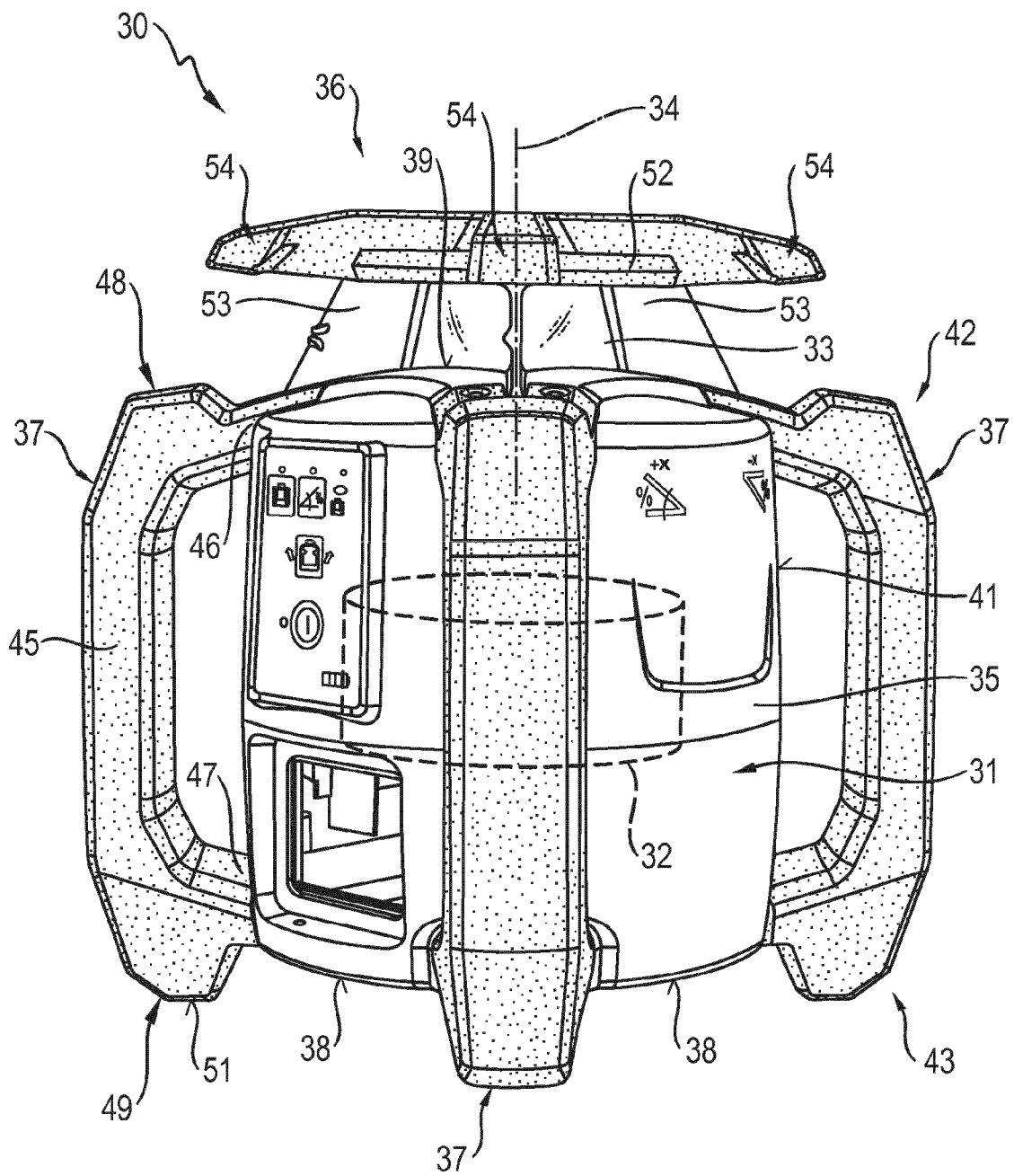
FIG. 2 a measuring device according to the invention in the form of a rotating laser with a device housing consisting of a base housing, a rotating head and several handles, whereby the rotating head and the handles consist of several parts made of an elastomeric plastic and a thermoplastic.

FIG. 2 shows a measuring device 30 according to the invention that is configured as a rotating laser. The rotating laser 30 comprises a device housing 31 and a measuring unit 32 that is arranged inside the device housing 31 and that is shown schematically in FIG. 2. The measuring unit 32 generates a laser beam in a radiation source, and this laser beam strikes a rotating optical deflector 33. The laser beam exits from the radiation source in an axial direction and it is deflected by 90° in a radial direction by means of the optical deflector 33. The optical deflector 33 rotates around the axis of rotation 34 that runs parallel to the axial direction of the emitted laser beam.

The device housing 31 of the rotating laser 30 comprises a base housing 35, a rotating head 36 and several handles 37. FIG. 2 shows a device housing 31 with four identically configured handles 37 that are arranged uniformly around the base housing 35. As an alternative, the device housing 31 can have one, two, three or more than four handles 37, and/or the handles can be configured differently. In a device housing 31 with at least three handles 37, the handles 37 can have a standing surface for positioning the rotating laser 30 in an upright arrangement on a substrate.

The base housing 35 comprises a bottom surface 38, a top surface 39 opposite from the bottom surface 38 and a side surface 41 that connects the bottom and top surfaces 38, 39. The rotating head 36 is connected at the top surface 39 to the base housing 35, and the handles 37 are attached to the base housing 35 at the upper end 42 facing the rotating head 36 and at the lower end 43 facing away from the upper end 42.

The handle 37 comprises a grip element 45 for holding the rotating laser 31 as well as an upper attachment element 46 and a lower attachment element 47 for attaching the handle 37 to the base housing 35. The handle 37 additionally comprises an upper shock absorbing element 48 at the upper end 42 and an lower shock absorbing element 49 at the lower end 43. The shock absorbing elements 48, 49 improve the energy absorption and the energy dissipation in the handle 37 in case of impact or a fall. The lower shock absorbing elements 49 each have a standing surface 51 and the rotating laser 30 is positioned in an upright arrangement on a substrate for horizontal laser operation. Thanks to this configuration of the lower shock absorbing elements 49 at the lower end 43 of the handles 37, in case of impact or a fall in the direction of the bottom surface 38, the device housing 31 lands on the lower shock absorbing elements 49, which absorb the impact energy and dissipate it. In case of impact or a fall, the bottom surface 38 of the base housing 35 is protected by the lower shock absorbing elements 49 against the effect of direct force.

The rotating head 36 protects the optical deflector 33 and it comprises a cover element 52 and several crosswise webs 53 that are connected to each other and that attach the rotating head 36 to the top surface 39 of the base housing 35. The crosswise webs 53 are configured to be as narrow as possible so that they only interrupt the laser beam to the smallest extent possible. On the cover element 52, there are several shock absorbing elements 54 that project from the cover element 52 in the axial direction parallel to the axis of rotation 34 as well as parallel to the laser plane perpendicular to the axis of rotation 34. Thanks to this configuration of the shock absorbing elements 54 on the cover element 52, in case of impact or a fall, the device housing 31 lands on the shock absorbing elements 54, which absorb and dissipate the impact energy. In case of impact or a fall, the shock absorbing elements 54 protect the cover element 52 and the crosswise webs 53 of the rotating head 36 against the effect of excessive direct forces.

The shape of the grip elements 45 and of the shock absorbing elements 48, 49, 54 has been selected with an eye towards achieving a high energy dissipation. The surfaces of the grip elements 45 and of the shock absorbing elements 48, 49, 54 that strike an obstacle or land on the ground in case of impact or a fall each enclose an obtuse angle between 90° and 180°. Owing to this configuration of the surfaces, the rotating laser can roll on the ground in case of impact or a fall and can thus dissipate some of the impact energy. Moreover, the grip elements 45 and the shock absorbing elements 48, 49, 54 are made of an elastic, energy-absorbing plastic and they additionally dissipate impact energy through the modality of elastic deformation.

Figure 3A:
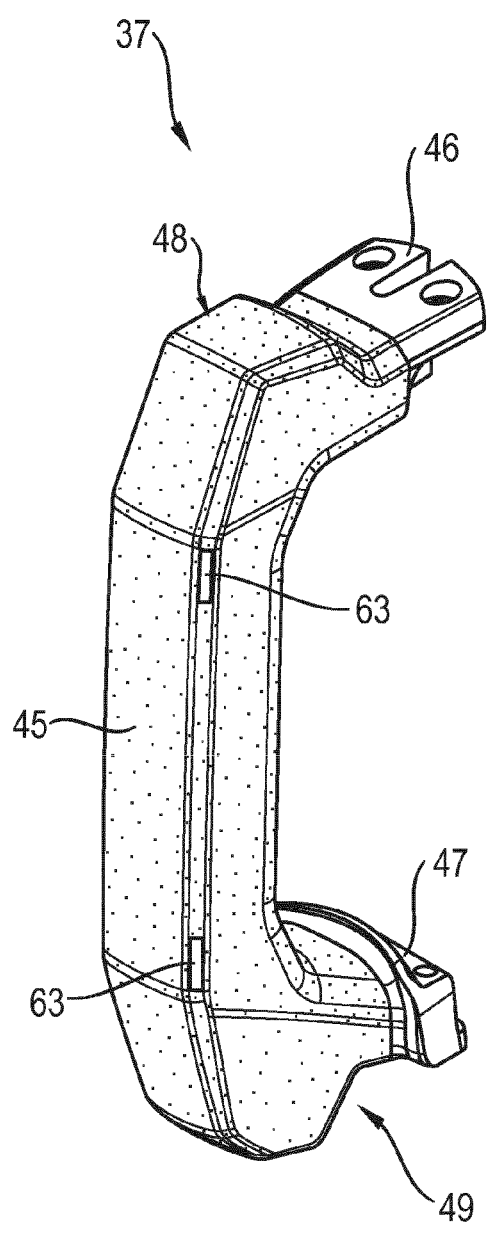
FIGS. 3A, B the structure of the handles of the rotating laser of FIG. 2 in a three-dimensional view (FIG. 3A) and in a section through the handle parallel to the axis of rotation of the rotating laser (FIG. 3B)
Figure 3B:
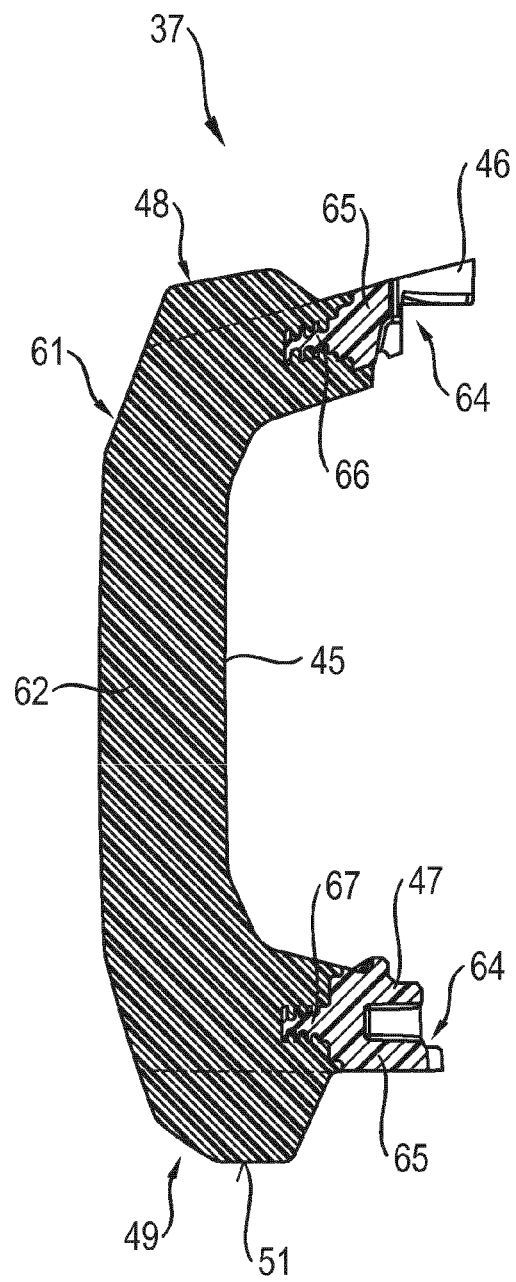

FIGS. 3A, B show the structure of the handles 37 of the rotating laser 30 of FIG. 2 in a detailed view, whereby FIG. 3A shows the handle 37 in a three-dimensional view and FIG. 3B shows a cross section through the handle 37 parallel to the axis of rotation 34 of the rotating laser 30 in FIG. 2.

The grip element 45, the upper shock absorbing element 48 and the lower shock absorbing element 49 form the first segment 61 of the handle 37. The first segment 61 is made of a first material 62 configured as an elastomeric plastic with a rebound resilience of less than 40% and a Shore-A hardness of less than 80. The properties of the elastomeric plastic 62 for the first segment 61 have been selected with an eye towards achieving a high energy dissipation in case of impact or a fall, and furthermore, the grip element 45 should be sufficiently stable so that the rotating laser 30 can be held by the handles 37. Suitable elastomeric plastics for the first segment include PUR elastomers, also in foamed form, rubbers and thermoplastic elastomers. The grip element 45 is provided with placement elements 63 with which the rotating laser 30 can be positioned in a prone arrangement on a substrate for vertical laser operation.

The upper and lower attachment elements 46, 47 form a second segment 64 of the housing 37. The second segment 64 is made of a second material 65 configured as a thermoplastic and produced, for example, by means of an injection-molding process. A multi-component process is used to produce the first segment 61 with the grip element 45, the shock absorbing elements 48, 49 and the placement elements 63 as well as to connect the first segment 61 to the second segment 64 with the upper and lower attachment elements 46, 47.

In the connection area to the grip element 45, the upper and lower attachment elements 46, 47 each have an elastically flexible connection element 66, 67 that enlarges the connection surface between the first and second segments 61, 64. The larger the connection surface between the first and second segments 61, 64, the better the connection. Moreover, the connection element 66, 67 acts like a spring element that is elastically deformed and subsequently returns to its original shape. Aside from the connection elements in the form of a pine-tree structure 66, 67 shown in FIG. 3B, any shapes that enlarge the connection surface can also be used.

The second material 65 is configured as a thermoplastic and it is used in the areas of the handles 37 that adjoin other housing sections and that have to be connected to them. The hard thermoplastic 65 permits a good connection of the handles 37 to the base housing 35. Thermoplastics have the advantage over elastomeric plastics that they can be welded and that they can be permanently connected to surrounding housing sections by means of screwed connections.

Figure 4:
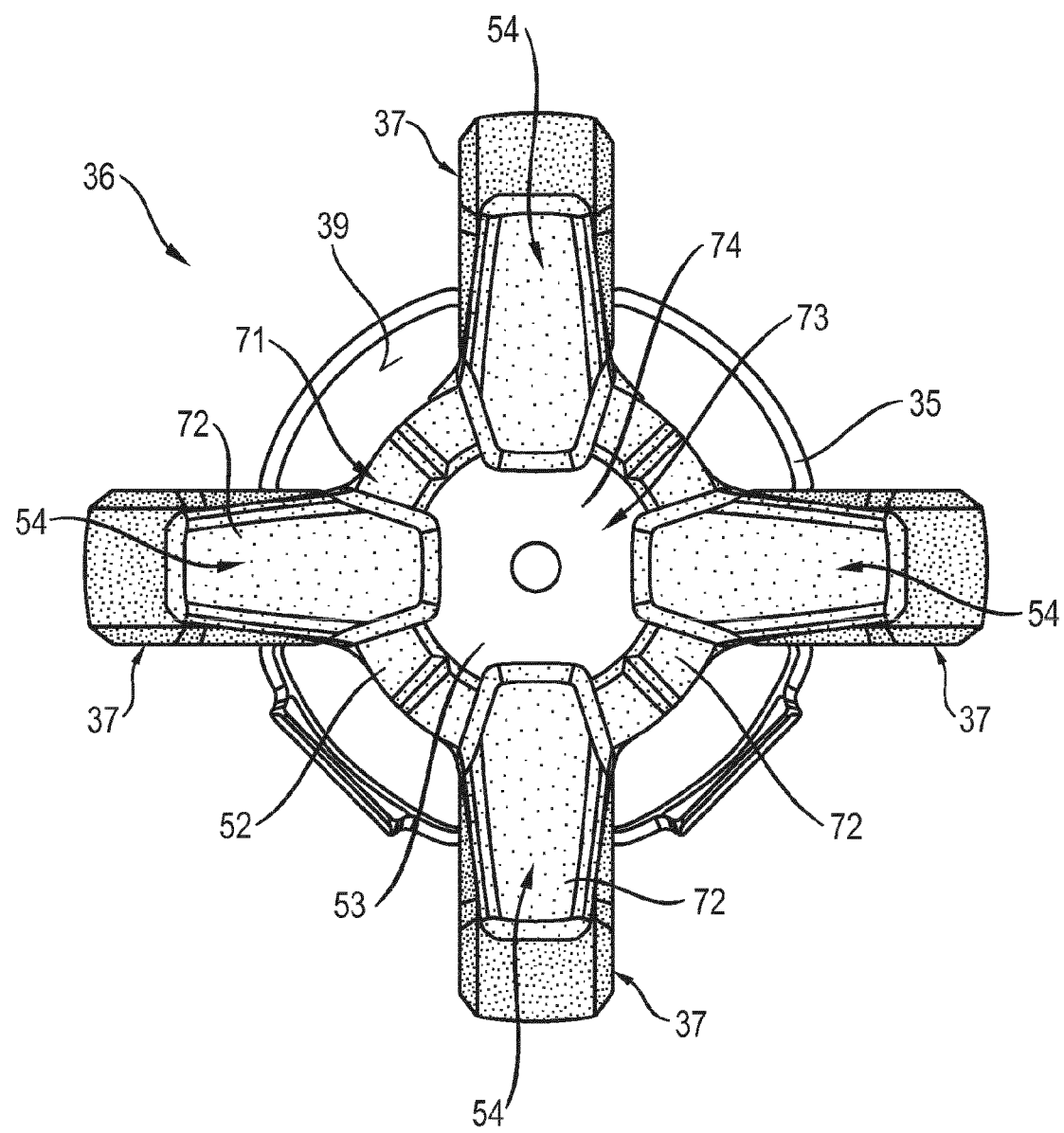
FIG. 4 the structure of the rotating head of the rotating laser of FIG. 2 in a view from the top.

FIG. 4 shows the structure of the rotating head 36 of the rotating laser 30 of FIG. 2 in a detailed top view. The rotating head 36 consists of the cover element 52, of several crosswise webs 53 and of several shock absorbing elements 54.

On the top facing away from the optical deflector 33, the cover element 52 has the shock absorbing elements 54 that project from the cover element 52 in the axial direction parallel to the axis of rotation 34 and parallel to the laser plane perpendicular to the axis of rotation 34. Moreover, the shock absorbing elements 54 project from the base housing 35 in the laser plane perpendicular to the axis of rotation 34. Thanks to this configuration of the shock absorbing elements 54 on the cover element 52, in case of impact or a fall, the device housing 31 lands on the shock absorbing elements 54, which absorb the impact energy and dissipate it. In case of impact or a fall, the shock absorbing elements 54 protect the cover element 52, the crosswise webs 53 and the optical deflector 33 of the rotating head 36 against the effect of excessive direct forces.

The cover element 52 and the shock absorbing elements 54 form a first segment 71 of the rotating head 36. The first segment 71 is made of a first material 72 that is configured as an elastomeric plastic with a rebound resilience of less than 40% and a Shore-A hardness of less than 80. The crosswise webs 53 that are connected to each other form a second segment 73 of the rotating head 36. The second segment 73 is made of a second material 74 that is configured as a thermoplastic.

Figure 5:
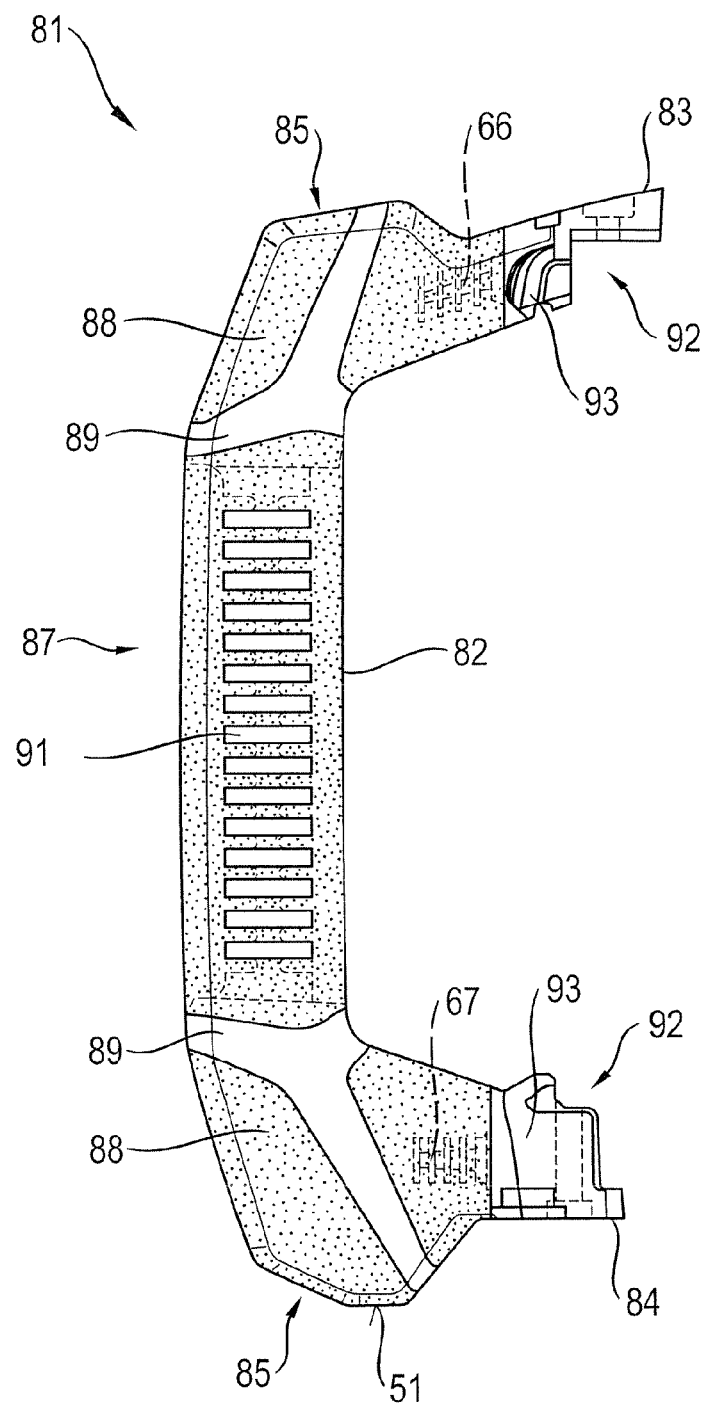
FIG. 5 an alternative embodiment of the handles for the rotating laser of FIG. 2.

FIG. 5 shows an alternative embodiment of a handle 81 for the rotating laser 30 of FIG. 2. In the rotating laser 30, the handle 81 replaces the handles 37. The handle 81 comprises a grip element 82, an upper attachment element 83, a lower attachment element 84, an upper shock absorbing element 85 and a lower shock absorbing element 86.

The grip element 82, the upper shock absorbing element 85 and the lower shock absorbing element 86 form the first segment 87 of the handle 81. The first segment 87 is made of a first material 88 that is configured as an elastomeric plastic with a rebound resilience of less than 40% and a Shore-A hardness of less than 80, as well as of another material 89. Here, the first segment 87 has a volume content of the first material 88 amounting to at least 50%. An insert element 91 that consists of the other material 89 and that can have additional damping, reinforcing or process-related functions is embedded in the first material 88. The upper and lower attachment elements 83, 84 form a second segment 92 that is made of a second material 93 configured as thermoplastic. The second segment 92 and the insert element 91 can be made of the same thermoplastic. As an alternative, the other material 89 of which the insert element 91 is made can be an elastomeric plastic that differs from the first material 88 or else a thermoplastic that differs from the second material 93.

FIG. 5 shows a handle 81 in which the insert element 91 is partially visible on the surface of the handle 81 and can be configured as a design element, for example, by selecting different colors for the materials 88, 89. As an alternative, the insert element 81 can be arranged in the handle 81 and can be completely surrounded by the elastomeric plastic 88. Moreover, the insert element in the grip element and the attachment elements can be made in one piece.

The invention claimed is:

1. A measuring device comprising:
   a device housing having at least one housing section made up of a first housing segment and a second housing segment, the first housing segment made of a first material, and the second housing segment made of a second material differing from the first material; and
   a measurer arranged at least partially inside the device housing,
   the first material being an elastomeric or thermoplastic-elastomeric plastic with a rebound resilience of less than 40% and a Shore-A hardness of less than 80, and the second material being a hard thermoplastic or a metal; wherein the measuring device is configured as a rotating laser and the at least one housing section includes a rotating head, a handle, and a base housing; wherein the at least one housing section includes at least two further handles, the rotating head and the handle and further handles being attached to the base housing; wherein the handle and further handles each comprise the first housing segment configured as a grip and made of the first material and the second housing segment configured as an attachment for attaching the handle or further handle to the base housing and made of the second material, a volume content of the first housing segment in the handle or further handle amounting to at least 50%; wherein the volume content of the first material in the first housing segment amounts to 100%.

2. The measuring device as recited in claim 1 wherein the first segment is connected to the second segment via multi-component injection-molding.

3. The measuring device as recited in claim 2 wherein the second segment has an elastically flexible connection element in a connection area leading to the first segment.

4. The measuring device as recited in claim 1 wherein the first housing segments of the handle and the further handles include another material, the other material differing from the first material.

5. The measuring device as recited in claim 4 wherein the first housing segments of the handles and the further handles have an elastically flexible insert element made at least partially of the other material.

6. The measuring device as recited in claim 1 wherein the second housing segments include an upper attachment element at an upper end facing the rotating head, and include a lower attachment element at the lower end facing away from the rotating head for attachment to the base housing.

7. The measuring device as recited in claim 1 wherein the first housing segments include at least one shock absorber.

8. The measuring device as recited in claim 7 wherein the at least one shock absorber includes a lower shock absorber element at a lower end, the lower shock absorber elements projecting from the base housing in an axial direction parallel to an axis of rotation of the rotating laser.

9. The measuring device as recited in claim 8 wherein the lower shock absorber elements have a standing surface for positioning the rotating laser in an upright arrangement on a substrate for horizontal laser operation.

10. The measuring device as recited in claim 7 wherein the at least one shock absorber includes an upper shock absorbing element at an upper end.

11. The measuring device as recited in claim 1 wherein the first housing segments of at least two of the handle and further handles have integrated placement positioners for positioning the rotating laser in a prone arrangement on a substrate for vertical laser operation.

12. A measuring device comprising:
a device housing having at least one housing section made up of a first housing segment and a second housing segment, the first housing segment made of a first material, and the second housing segment made of a second material differing from the first material; and
a measurer arranged at least partially inside the device housing,
the first material being an elastomeric or thermoplastic-elastomeric plastic with a rebound resilience of less than 40% and a Shore-A hardness of less than 80, and the second material being a hard thermoplastic or a metal; wherein the measuring device is configured as a rotating laser and the at least one housing section includes a rotating head, a handle, and a base housing; wherein the at least one housing section includes at least two further handles, the rotating head and the handle and further handles being attached to the base housing; wherein the handle and further handles each comprise the first housing segment configured as a grip and made of the first material and the second housing segment configured as an attachment for attaching the handle or further handle to the base housing and made of the second material, a volume content of the first housing segment in the handle or further handle amounting to at least 50%; wherein the volume content of the first material in the first housing segment amounts to 50%; wherein the first housing segments of the handle and the further handles include another material, the other material differing from the first material; wherein the first housing segments of the handles and the further handles have an elastically flexible insert element made at least partially of the other material.

13. A measuring device comprising:
a device housing having at least one housing section made up of a first housing segment and a second housing segment, the first housing segment made of a first material, and the second housing segment made of a second material differing from the first material; and
a measurer arranged at least partially inside the device housing,
the first material being an elastomeric or thermoplastic-elastomeric plastic with a rebound resilience of less than 40% and a Shore-A hardness of less than 80, and the second material being a hard thermoplastic or a metal; wherein the measuring device is configured as a rotating laser and the at least one housing section includes a rotating head, a handle, and a base housing; wherein the rotating head includes the first housing segment configured as a top element made of the first material, and includes the second housing segment, the second housing segment having several crosswise webs made of the second material, a volume content of the first housing segment amounts to at least 50%; wherein the volume content of the first material in the first housing segment of the rotating head amounts to 100%.

14. A measuring device comprising:
a device housing having at least one housing section made up of a first housing segment and a second housing segment, the first housing segment made of a first material, and the second housing segment made of a second material differing from the first material; and
a measurer arranged at least partially inside the device housing,
the first material being an elastomeric or thermoplastic-elastomeric plastic with a rebound resilience of less than 40% and a Shore-A hardness of less than 80, and the second material being a hard thermoplastic or a metal; wherein the measuring device is configured as a rotating laser and the at least one housing section includes a rotating head, a handle, and a base housing; wherein the rotating head includes the first housing segment configured as a top element made of the first material, and includes the second housing segment, the second housing segment having several crosswise webs made of the second material, a volume content of the first housing segment amounts to at least 50%; wherein the volume content of the first material in the first housing segment of the rotating head amounts to at least 50%; wherein the first segment of the rotating head includes another material, the other material differing from the first material; wherein the first housing segment of the rotating head has an elastically flexible insert element made at least partially of the other material.

* * * * *